(12) United States Patent
Zhang et al.

(10) Patent No.: US 11,580,104 B2
(45) Date of Patent: Feb. 14, 2023

(54) METHOD, APPARATUS, DEVICE, AND STORAGE MEDIUM FOR INTENTION RECOMMENDATION

(71) Applicant: BEIJING BAIDU NETCOM SCIENCE TECHNOLOGY CO., LTD., Beijing (CN)

(72) Inventors: Yang Zhang, Beijing (CN); Shuangquan Yang, Beijing (CN); Yi Xie, Beijing (CN); Chang Liu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 85 days.

(21) Appl. No.: 17/207,503

(22) Filed: Mar. 19, 2021

(65) Prior Publication Data

US 2021/0209109 A1 Jul. 8, 2021

(30) Foreign Application Priority Data

Jun. 29, 2020 (CN) .......................... 202010604365.0

(51) Int. Cl.
*G06F 16/245* (2019.01)
*G06F 16/2453* (2019.01)
(Continued)

(52) U.S. Cl.
CPC .... *G06F 16/24542* (2019.01); *G06F 16/2246* (2019.01); *G06F 16/9535* (2019.01); *G06N 5/04* (2013.01)

(58) Field of Classification Search
CPC .......... G06F 16/24542; G06F 16/2246; G06F 16/9535; G06N 5/04
See application file for complete search history.

(56) References Cited

U.S. PATENT DOCUMENTS 10,402,412 B2 * 9/2019 Raina ................ G06F 16/24578
10,891,673 B1 * 1/2021 Sawaf ................ G06Q 30/0643
(Continued)

FOREIGN PATENT DOCUMENTS

CN 103942204 A 7/2014
CN 105159977 A 12/2015
(Continued)

OTHER PUBLICATIONS

CN10394224A English translation, QinYin et al. ,22 pages. Jul. 23, 2014. (Year: 2014).*
(Continued)

*Primary Examiner* — Alford W Kindred
*Assistant Examiner* — Tiffany Thuy Bui
(74) *Attorney, Agent, or Firm* — J.C. Patents

(57) ABSTRACT

The present application discloses a method, an apparatus, a device, and a storage medium for intention recommendation, which relates to the field of big data, artificial intelligence, intelligent search, information flow and deep learning technologies in the field of computer technologies. A specific implementation scheme includes: receiving an intention query request carrying an intention keyword and a user identification, determining a first recommendation list according to the intention keyword and a pre-configured intention repository, where the intention repository includes at least one tree-shaped intention set, and each tree-shaped intention set includes at least one graded intention, processing intentions in the first recommendation list by using intention strategy information corresponding to the user identification to obtain a target recommendation list and output it.

13 Claims, 6 Drawing Sheets

(51) Int. Cl.
*G06F 16/22* (2019.01)
*G06F 16/9535* (2019.01)
*G06N 5/04* (2023.01)

(56) References Cited

U.S. PATENT DOCUMENTS

| | | | |
|---|---|---|---|
| 11,023,947 B1* | 6/2021 | Bosley | G06Q 30/0631 |
| 2016/0364441 A1 | 12/2016 | Nguyen | |
| 2017/0250930 A1* | 8/2017 | Ben-Itzhak | G06F 3/0488 |
| 2018/0189289 A1 | 7/2018 | Wexler | |
| 2019/0197185 A1* | 6/2019 | Miseldine | G06N 7/005 |
| 2020/0050426 A1* | 2/2020 | Jung | G06N 5/041 |
| 2020/0242183 A1* | 7/2020 | Sun | G06F 3/04842 |
| 2020/0310888 A1* | 10/2020 | Gopalan | G06F 9/54 |
| 2020/0356360 A1* | 11/2020 | Gupta | G06N 20/00 |
| 2020/0380402 A1* | 12/2020 | Scott, II | G06N 3/08 |
| 2021/0027788 A1* | 1/2021 | Xu | G10L 15/26 |
| 2021/0266287 A1* | 8/2021 | Zhang | G06N 5/02 |

FOREIGN PATENT DOCUMENTS

| | | |
|---|---|---|
| JP | 2017097914 A | 6/2017 |
| JP | 2019530920 A | 10/2019 |
| WO | WO2011052315 | 5/2011 |

OTHER PUBLICATIONS

NPL: "Recommendation System (2)—User Behavior Data", downloaded from: https://zhuanlan.zhihu.com/p/47025768.
European International Search Report of EP21163982.8.
NPL1: "Intention Recognition using a Graph Representation", International Journal of Applied Science, Engineering and Technology vol. 4, No. 1, pp. 13-18.
NPL2: "Divided Pretreatment to Targets and Intentions for Query Recommendation" First CCF Conference, NLPCC 2012, Beijing, China, Oct. 31-Nov. 5, 2012. Proceedings, ISSN: 1865-0929, vol. 333, pp. 199-212.
NPL3: "Model-based approach for Collaborative Filtering Zebra", the 6th International Conference on Information Technology for Education, Ho Chi Minh City, Aug. 2, 2010, pp. 217-228.
First Office Action of the parallel application JP2021-065388.

* cited by examiner

METHOD, APPARATUS, DEVICE, AND STORAGE MEDIUM FOR INTENTION RECOMMENDATION

CROSS-REFERENCE TO RELATED APPLICATION

This application claims priority to Chinese Patent Application No. 202010604365.0, filed on Jun. 29, 2020, which is hereby incorporated by reference in its entirety.

TECHNICAL FIELD

Embodiment of the present application relates to the field of big data, artificial intelligence, intelligent search, information flow and deep learning technologies in the field of computer technologies, and in particular, to a method, an apparatus, a device and a storage medium for intention recommendation.

BACKGROUND

With the rapid development of Internet technologies, it is possible to obtain intention information for a target object by performing information research and judgment and relation research and judgment on the target object based on user behavior data and collected data, thereby implementing a recommendation of an intention.

In the prior art, methods for intention recommendation mainly determine appropriate intentions based on rules or strategies or user behaviors, etc., and make a recommendation. However, since applied scenarios need to be considered in the processing procedure of recommendation based on rules, strategies, or user behaviors, the scope of application is limited, and there is a problem of low recommendation accuracy.

SUMMARY

The present disclosure provides a method, an apparatus, a device and a storage medium for intention recommendation.

In a first aspect, the present application provides a method for intention recommendation, including:

receiving an intention query request, where the intention query request carries an intention keyword and a user identification;

determining a first recommendation list according to the intention keyword and a pre-configured intention repository, where the intention repository includes at least one tree-shaped intention set, and each of the at least one tree-shaped intention set includes at least one graded intention;

processing intentions in the first recommendation list by using intention strategy information corresponding to the user identification to obtain a target recommendation list; and outputting the target recommendation list.

In a second aspect, the present application provides an apparatus for intention recommendation, including: a receiving module, a first processing module, a second processing module and an output module; where the receiving module is configured to receive an intention query request, where the intention query request carries an intention keyword and a user identification;

the first processing module is configured to determine a first recommendation list according to the intention keyword and a pre-configured intention repository, where the intention repository includes at least one tree-shaped intention set and each of the at least one tree-shaped intention set includes at least one graded intention;

the second processing module is configured to process intentions in the first recommendation list by using intention strategy information corresponding to the user identification to obtain a target recommendation list; and the output module is configured to output the target recommendation list.

In a third aspect, the present application provides an electronic device, including:

at least one processor; and a memory communicatively connected to the at least one processor; where the memory is stored with instructions executable by the at least one processor, and the instructions are executed by the at least one processor to enable the at least one processor to execute the method described in the first aspect and possible designs of the first aspect.

In a fourth aspect, the present application provides a non-transitory computer readable storage medium stored with computer instructions, where the computer instructions are configured to enable a computer to execute the method described in the first aspect and possible designs of the first aspect.

In a fifth aspect, the present application provides a method for intention recommendation, including:

determining a first recommendation list according to a received intention query request and an intention category rule; and processing intentions in the first recommendation list by using a preset intention intervention strategy to obtain a target recommendation list.

In the method, the apparatus, the device and the storage medium for intention recommendation provided by the embodiments of the present application, an intention query request is received which carries an intention keyword and a user identification; a first recommendation list is determined according to the intention keyword and a pre-configured intention repository, where the intention repository includes at least one tree-shaped intention set and each of the at least one tree-shaped intention set includes at least one graded intention; intentions in the first recommendation list are processed by using intention strategy information corresponding to the user identification to obtain a target recommendation list; and finally the target recommendation list is outputted. In the technical solutions, an intention having relatively high relevance to the intention query request can be determined based on the pre-configured intention repository, and a personalized recommendation result can be improved based on the intention strategy information of the user identification, thereby improving the accuracy and personalization precision of the intention recommendation.

It should be understood that the content described in this section is not intended to point out the key or important features of embodiments of the present application, nor to limit the scope of the present application. Other features of the present application will be easily understood through the following description.

BRIEF DESCRIPTION OF DRAWINGS

The drawings are used for better understanding of the present solution and do not constitute a limitation of the present application.

DESCRIPTION OF EMBODIMENTS

Figure 1:
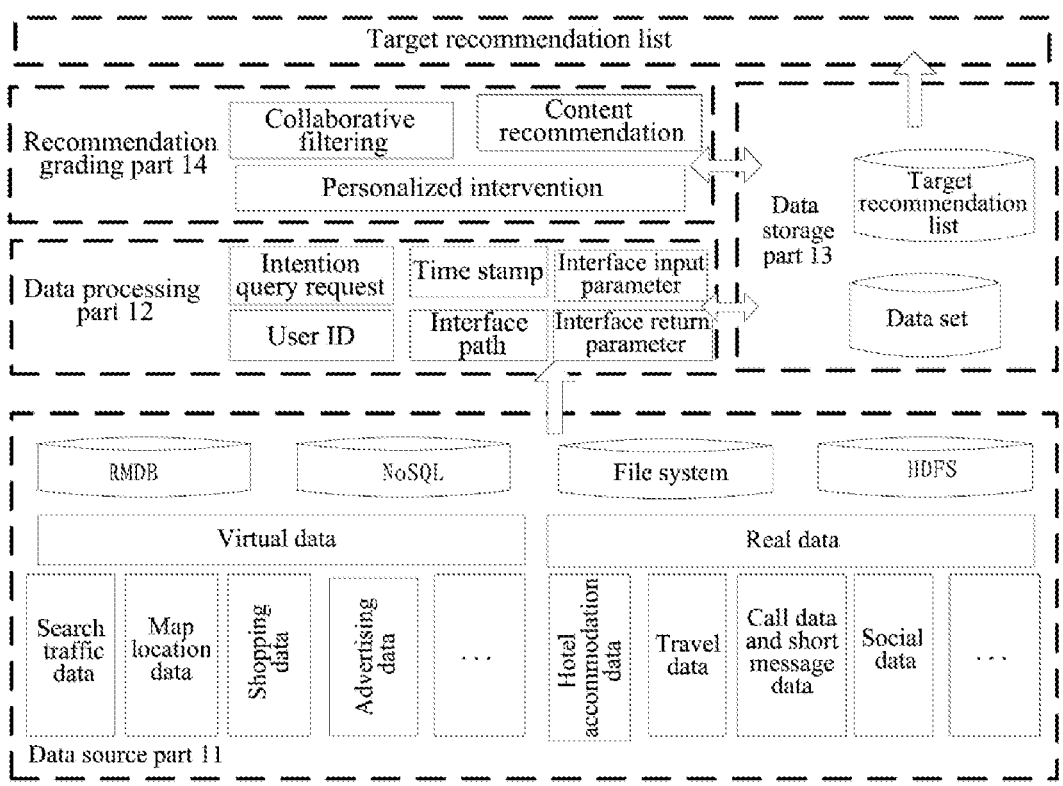
FIG. 1 is a schematic diagram of a system architecture of a method for intention recommendation provided by an embodiment of the present application.

The following describes exemplary embodiments of the present application with reference to the accompanying drawings, which includes various details of the embodiments of the present application to facilitate understanding, and the described embodiments are merely exemplary. Therefore, persons of ordinary skill in the art should know that various changes and modifications can be made to the embodiments described herein without departing from the scope and spirit of the present application. Also, for clarity and conciseness, descriptions of well-known functions and structures are omitted in the following description.

Before introducing the technical solution of the present application, terms involved in embodiments of the present application are explained first:

Intention: refers to a truly intended meaning corresponding to a short and vague query request input by a user.

Tactic: refers to application strategies and skills created for various situations.

Readability/interpretability: refers to that an expression of an intention is more consistent with an expression habit in an application environment, rather than just a simple stacking of multiple words or phrases.

User behavior-based collaborative filtering algorithm: used to recommend to a user an intention of another user with a similar behavior to the user.

Intention-based collaborative filtering algorithm: used to recommend to a user an intention similar to his previous intention.

Before introducing the technical solution and system architecture of the present application, an application background of the technical solution of the present application is introduced first.

With the rapid popularization of the Internet environment and various collection devices such as monitor devices, checkpoints, a large amount of user data is generated or acquired every day.

Optionally, user data may include user behavior data and user identity data. The user behavior data may include: hotel accommodation behavior data (various types of hotels, rented houses, hourly houses, long-term rental houses, etc.), transport travel behavior data (taking train, high-speed rail, plane, ferry, etc.), call behavior data (mobile phone short message, fixed line call information, mobile phone call information, etc.), express delivery behavior data, criminal detention behavior (information on records of prison sentences). The user identity data may include: face data (for example, face information collected through traffic cameras, hotel cameras, user-installed cameras, etc.), various identity documents (ID) on the Internet (including device ID, such as international mobile equipment identity (IMEI), identifier for advertising (IDFA), etc.; network ID, such as internet protocol (IP) address, access point (AP), service set identifier (SSID), etc.).

In practical police service scenarios, the police may perform research and judgment on information and relationship of a target object based on user behavior data and user identity data. Optionally, the process of research and judgment itself is a process of query of tactic and recommendation. Research and judgment intention includes: an association relationship intention (traveling together, living together, call, courier, inmate); a one-person-one-file information intention (travel record, accommodation records, call records, express delivery records, custody records); a message element intention (text information, intelligence, short messages); an intention of current major political hot topics (an international airport, riots in a certain place); a tag intention (population tag), etc.

However, as the collected or acquired user data continues to accumulate, behavior trajectories of key objects/suspected objects have rapidly expanded. In order to make accurate tactic intention recommendation, the following challenging issues need to be resolved:

Computing and storage resources: to solve the problem of processing PB level data, where PB refers to petabyte, which is a higher-level storage unit, 1PB=1024 TB. That is, since a large amount of log data of search and click is generated every day, a large amount of log preprocessing and data calculation are required.

Police service usage scenarios: criminal intention recommendations would not be exactly the same for various types of police in various scenarios, which need to complement each other.

Expansion of tactic intentions: as the situation of maintaining stability and anti-terrorism has intensified, new and effective tactics have been continuously updated and added. It is necessary to adapt to and expand new tactics, and discard and eliminate tactics with lower effectiveness at the same time.

It can be learnt from the introduction of the background that methods for intention recommendation in the prior art mainly determine an appropriate intention based on rules, strategies or user behaviors, etc., and make a recommendation.

Specifically, in terms of the personalization and similarity of recommendation, methods for intention recommendation are mainly divided into a user behavior-based recommendation, a query result-based recommendation, and a hot topic-based recommendation. Among them, the user behavior-based recommendation refers to: learning a user similarity model according to search and click behaviors of different users, and recommending a query result of a similar user. The query result-based recommendation refers to: learning a result set similarity model according to various characteristics of result sets, and recommending other content that is similar to a query result. The hot topic-based recommendation refers to: recommending a major hot topic that has recently appeared, which is not highly relevant to a behavior of a query user and a content of a query.

In terms of algorithms of recommendation models, methods for intention recommendation are mainly divided into a rule-based algorithm, a supervised algorithm and an unsupervised algorithm. Among them, the rule-based algorithm mainly refers to: formulating a specific rule for recommendation in advance, such as, if a certain type of user queries a certain type of specific intention, then a certain rule would be hit, and a pre-made content would be recommended. The supervised algorithm mainly includes a support vector machine algorithm, a neural network algorithm, a logistic regression algorithms, etc. A tag category of user behavior or queried content is predicted, and then content under the same category is recommended. The unsupervised algorithm mainly includes a clustering algorithm, a nearest neighbor algorithm, a similarity matrix, etc. A similar user or result is recommended through calculating similarity or classification.

In terms of recommendation methods for tactics and intentions, methods for intention recommendation mainly refer to recommendation based on tactics, that is, different query intentions constitute different tactics. The recommended intention itself may constitute a certain potential tactic to solve a certain type of problem.

However, there are certain problems in the above-mentioned different recommendation methods, which will be explained from the aspects of rule-based, strategy-based, user behavior-based, etc.

Optionally, in a rule-based scheme, although it is possible to quickly generate a recommendation result through writing rules, it is relatively single; applicable and inapplicable scenarios need to be considered when defining the rules. As the number of users increases, behavioral data grows and tactics expand, the writing and maintenance of rules will become very difficult. The generalization ability of rules is limited, and it is difficult to exhaust all of them; in addition, it is difficult to abstract a rule from a complex scenario, which is of high cost.

In a strategy-based scheme, although machine learning or other model algorithms can be used to improve the generalization ability of the model and reduce the load of writing rules, it is difficult to interfere with whether a recommendation result is a highly similar intention or a personalized intention. Uneven distribution of collected data for different recommendation categories may lead to biased recommendations; and a strategy model is of high cost, and is usually need to be retrained.

In a user behavior-based recommendation scheme, mining similar users and recommending results of their clicks and queries facilitates the discovering of new strategies and intentions, but it relies on a large amount of user behavior data. The effect will be compromised when the recommended system is cold-started and the number of users is small. While the calculation of user similarity will take up a large amount of resources when the number of users is particularly large and the number of result sets is small.

Based on the above analysis, since applied scenarios need to be considered in the processing procedure of recommendation based on rules, strategies, or user behaviors, the scope of application is limited, and there is a problem of low recommendation accuracy.

Aiming at the above problems, embodiments of the present application provide a method for intention recommendation. For example, for an intention query request in a police service scenario, which may be implemented based on a natural language, specifically, through extracting an intention keyword and a user identification existing in the intention query request (query sentence), firstly, a first recommendation list may be determined according to the intention keyword and a pre-configured intention repository, where the intention repository includes at least one tree-shaped intention set, and each tree-shaped intention set includes at least one graded intention; secondly, intentions in the first recommendation list are processed by using intention strategy information corresponding to the user identification to obtain a target recommendation list, and finally the target recommendation list is outputted. Intentions having relatively high relevance to the intention query request can be determined based on the pre-configured intention repository, and a personalized recommendation result can be improved based on the intention strategy information of the user identification, thereby improving the accuracy and personalization precision of the intention recommendation.

Furthermore, a recommendation for tactic intention may be made by using collaborative filtering technology in the embodiments of the present application. Specifically, every intention query request of users may be used as a component of a certain tactic. Through built-in tactic analysis and learning of other user behavior tactics, relevant intentions are recommended, and thus a user only needs to conduct a small amount of input and click operations, then the whole intention that the user wants to query can be "guessed" and "predicted".

Optionally, in practical application, after receiving an intention query request, firstly, a query eigenvector of a user is generated through analyzing an entity (person, object, time, place, etc.) category corresponding to the intention query request, arrangement and combination order between entities, and an identity ID of the user, and then similarity retrieval is performed through a collaborative filtering related algorithm and an offline trained recommendation model, and a recommendation result set is obtained by intervening and strengthening through a personalized tactic intention rule.

Before introducing the technical solution of the present application, the system architecture of the technical solution of the present application is introduced first. FIG. 1 is a schematic diagram of a system architecture of an intention recommendation method provided by an embodiment of the present application. Referring to FIG. 1, the system architecture includes: a data source part 11, a data processing part 12, a data storage part 13 and a recommendation grading part 14.

The data source part 11 mainly refers to a generation stage of a user data set, and a data source. In an embodiment of the present application, the user data set may include virtual data and real data of the Internet. Optionally, the virtual data may include search traffic data, map location data, shopping data, advertising data, etc., and the real data may include hotel accommodation data, travel data (high-speed rail, airplane, ferry, etc.), call data and short message data, and social data, etc.

Optionally, storage systems for the user data set mainly include a relational database management system (RMDB), a non-relational database (NoSQL), a file system (file) and a hadoop distributed file system (HDFS), etc. In order to be able to obtain user data from different storage systems, preset configuration information needs to be obtained, and then user data is obtained from different storage systems according to the preset configuration information.

Optionally, the data source part 11 is mainly configured to generate raw data of user behavior. The data processing part 12 is mainly configured to obtain a user data set from the data source part 11 based on a received intention query request, process the user data set to obtain information, such as, a user ID, an interface path, an interface return parameter, an interface input parameter, a time stamp, etc., and perform data cleaning and other processing based on the obtained information, such as the user ID, the interface path, the interface return parameter, the interface input parameter, the time stamp, etc., so as to obtain a target data set and store it in the data storage part 13.

Optionally, the recommendation grading part 14 is mainly configured to obtain the intention query request from the data processing part 12 and the pre-processed target data set from the data storage part 13, and determine a target recommendation list based on the intention query request and the target data set and according to rules of collaborative filtering, content recommendation, and personalized intervention, etc., and output the target recommendation list while storing it in the data storage part 13.

It can be understood that the diagram of the system architecture described in FIG. 1 is only an exemplary illustration. In practical application, it can be adjusted according to practical needs, which is not limited in the embodiments of the present application.

Optionally, an executive entity of an embodiment of the present application may be an electronic device, for example, a terminal device such as a computer and a tablet computer, or a server, for example, a background processing platform. Therefore, in this embodiment, the terminal device and the server are collectively referred to as the electronic device for explanation, and whether the electronic device is specifically a terminal device or a server may be determined in practical conditions.

Optionally, an embodiment of this present application provides a method for intention recommendation, which is applied to the field of big data, artificial intelligence, intelligent search, information flow and deep learning technologies in the field of computer technologies, mainly involves data collection, data model calculation, recommendation grading strategy and other parts, supports privatization deployment, and facilitates the use for multiple police types in multiple scenarios, to improve the accuracy and personalization precision of the intention recommendation.

The technical solution of the present application will be described in detail below through specific embodiments. It should be noted that the following specific embodiments may be combined with each other, and the same or similar concepts or processes may not be repeated in some embodiments.

Figure 2:
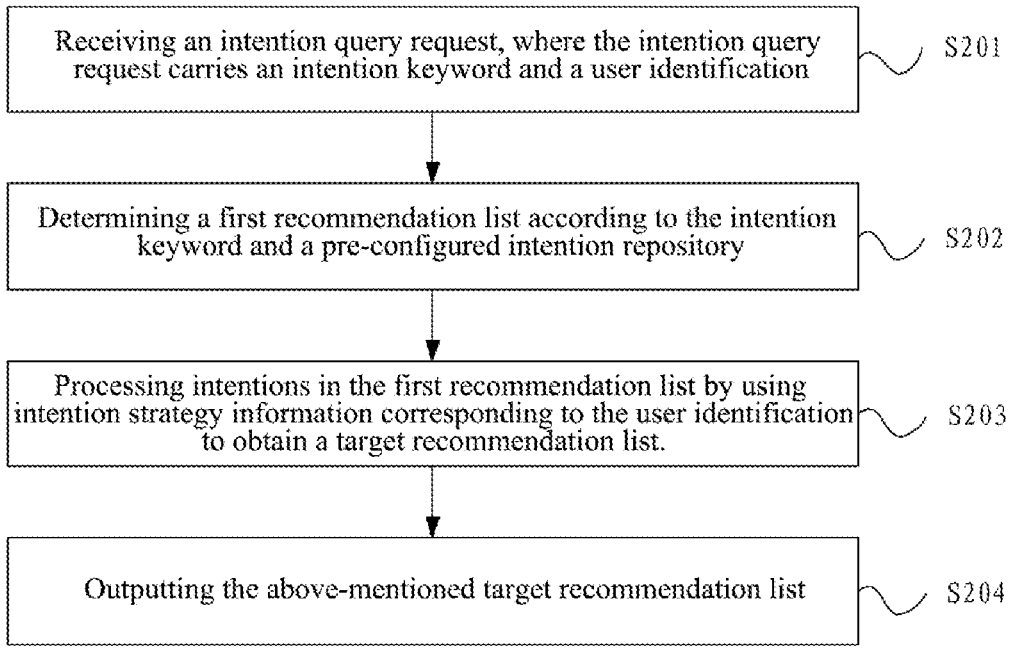
FIG. 2 is a schematic flowchart of a method for intention recommendation according to a first embodiment of the present application.

FIG. 2 is a schematic flowchart of a method for intention recommendation according to a first embodiment of the present application. As shown in FIG. 2, the method may include the following steps:

S201, receiving an intention query request, where the intention query request carries an intention keyword and a user identification.

In an embodiment of the present application, when a user has a need for query, the user may send an intention query request to request an electronic device to process the intention query request and output information that the user really wants to get, that is, the intention.

Optionally, the electronic device may receive the intention query request sent by the user in a variety of manners, such as text, voice, etc. This embodiment does not limit the manner in which the user sends the intention query request, which may be determined according to practical scenario, and will not be repeated here.

Optionally, in order to enable the electronic device to perform intention query in a targeted manner, an intent keyword may be carried in the intention query request, and in order to determine a personalized intention of a user, the user identification may be carried in the intention query request. It can be understood that the user identification may be characterized by a device identification, a network identification, etc. through which the user sends the intention query request. The embodiment of the present application does not limit the specific manifestation of the user identification, which may be determined according to practical scenarios.

For example, a user sends an intention query request through a terminal device. Optionally, the intention query request is a query sentence, for example, "how is the weather in XX", then intention keywords corresponding to the intention query request is "XX" and "weather", and a user identification carried by the intention query request may be characterized by an identification of the terminal device.

S202, determining a first recommendation list according to the intention keyword and a pre-configured intention repository.

The intention repository includes at least one tree-shaped intention set, and each of the at least one tree-shaped intention set includes at least one graded intention.

In practical application, the intention repository may be pre-configured in the electronic device. Intentions in the intention repository may be built in the system or customized by the user. The embodiments of the present application do not limit the specific formation manner of the intentions, which may be determined according to practical scenarios.

Optionally, in order to characterize the fineness of intentions, in an embodiment of the present application, the intentions in the intention repository may be stored in a tree-shaped structure. Therefore, the intention repository includes at least one tree-shaped intention set, and each of the at least one tree-shaped intention set includes at least one graded intention. For example, each tree-shaped intention set includes a primary intention, a second-level intention, a third-level intention, etc., and each branch of each tree-shaped intention has a unique intention code.

Optionally, since a tree is a kind of data structure, it is a collection that is composed of at least one finite node and that has a hierarchical relationship. In an embodiment of the present application, the tree-shaped intention set has the following characteristics: an intention of each level has zero or multiple child intentions, an intention without a parent intention is called a primary intention, each non-primary intention has one and only one parent intention, and except for the primary intention, each child intention may be divided into multiple sub-tree-shaped intention sets that do not intersect.

In an embodiment of the present application, after receiving an intention query request, the electronic device may determine an intention keyword corresponding to the intention query request by analyzing the intention query request, query in a pre-configured intention repository according to the intention keyword to determine a graded intention to which the intention keyword belongs and a tree-shaped intention set to which the graded intention belongs, and then sort all intentions included in the tree-shaped intention set to which the intention keyword belongs based on a preset sorting rule, so as to generate the first recommendation list.

S203, processing intentions in the first recommendation list by using intention strategy information corresponding to the user identification to obtain a target recommendation list.

In practical application, as time goes by, the pre-configured intention repository in the electronic device will be continuously updated, for example, new intentions are generated based on user needs and are added to the intention repository, and outdated intentions are discarded, etc. Therefore, in order to improve the accuracy of the intention recommendation, the electronic device is preset with personalized intention intervention strategy information, that is, different users may correspond to different intention strategy information.

In an embodiment of the present application, after receiving an intention query request and determining a user identification corresponding to the intention query request, the electronic device may query pre-configured personalized intention intervention strategy information in the electronic device according to the user identification to determine intention strategy information corresponding to the user identification Correspondingly, the electronic device may intervene in the intentions in the above determined first recommendation list by using the intention strategy information corresponding to the user, for example, discarding some intentions, and rearranging the order of the intentions, etc., so as to obtain a processed recommendation list, i.e. a target recommendation list.

S204, outputting the above-mentioned target recommendation list.

In an embodiment of the present application, after determining the target recommendation list based on the intention query request, the electronic device may output the target recommendation list, for example, push it to the terminal device of the user corresponding to the user identification for the user to view.

In the method for intention recommendation provided by embodiments of the present application, an intention query request is received which carries an intention keyword and a user identification, a first recommendation list is determined according to the intention keyword and a pre-configured intention repository, where the intention repository includes at least one tree-shaped intention set, and each of the at least one tree-shaped intention set includes at least one graded intention, intentions in the first recommendation list are processed by using intention strategy information corresponding to the user identification to obtain a target recommendation list, and finally the target recommendation list is outputted. In this technical solution, intentions having relatively high relevance to the intention query request can be determined based on the pre-configured intention repository, and a personalized recommendation result can be improved based on the intention strategy information of the user identification, thereby improving the accuracy and personalization precision of the intention recommendation.

Figure 3:
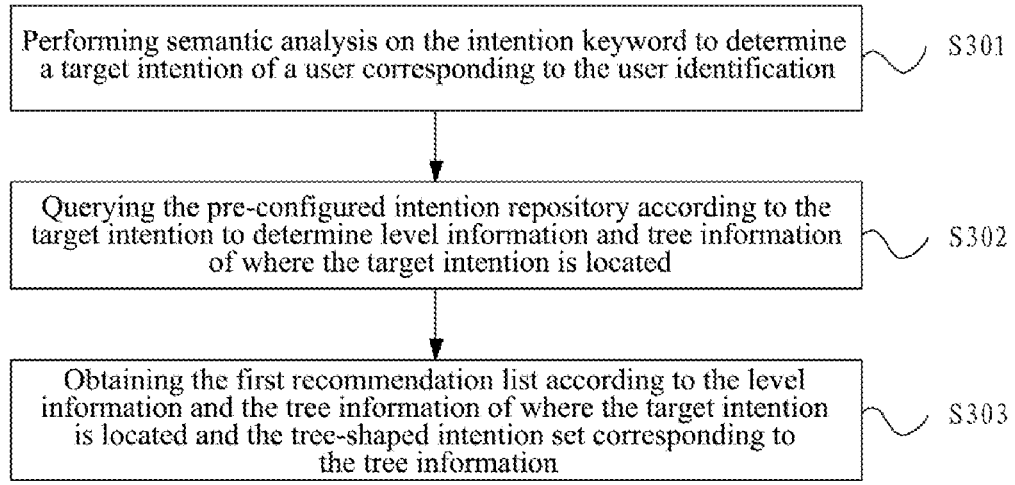
FIG. 3 is a schematic flowchart of a method for intention recommendation according to a second embodiment of the present application.

Illustratively, on the basis of the foregoing embodiments, FIG. 3 is a schematic flowchart of a method for intention recommendation according to a second embodiment of the present application. As shown in FIG. 3, in this embodiment, the above S202 can be implemented through the following steps:

S301, performing semantic analysis on the intention keyword to determine a target intention of the user corresponding to the user identification.

In an embodiment of the present application, an intention query request sent by the user is usually in a natural language, which is more colloquial, and a substantive content is obtained by analyzing the natural language, that is, the target intention of the user corresponding to the user identification is determined.

Illustratively, since users can send intention query requests in a variety of manners, different analysis manners may be used for different manners. Illustratively, if a user sends the intention query request by voice, the electronic device firstly converts a voice intention query request into text information when obtaining the voice intention query request, determines an intention keyword in the text information, and then performs semantic analysis on the intention keyword to determine a time, a place, a person, an event and other elements corresponding to the intention keyword, so as to obtain a target intention of the user corresponding to the user identification.

S302, querying the pre-configured intention repository according to the target intention to determine level information and tree information of where the target intention is located.

Optionally, in an embodiment of the present application, there is at least one tree-shaped intention set stored in the intention repository, each of the at least one tree-shaped intention set includes at least one level, and each branch of each tree-shaped intention has a unique intention code. The intention code itself reflects a classification level of intention. It can be understood that the higher the level of intention, the finer the classification of intention.

Illustratively, Table 1 shows a tree-shaped intention set with three levels of intention. As shown in Table 1, the tree-shaped intention set includes three levels intentions, namely, a primary intention-A, a second-level intention-B, and a third-level intention-C. Correspondingly, since the second-level intention includes an association relationship intention-B1 and a one-person-one-file intention-B2, the third-level intention includes traveling together-C1 and travel-C2. Therefore, the tree-shaped intention set includes two branches, which are represented by an intention code A1B1C1-tongxing (which is the Pinyin for "travel together") and an intention code A1B2C2-chuixing (which is the Pinyin for "travel").

TABLE 1

| A tree-shaped intention set with three levels of intentions | | | |
|---|---|---|---|
| Primary intention-A | Second-level intention-B | Third-level intention-C | Code |
| Person research and judgment intention-A1 | Association relationship intention-B1 | Traveling together-C1 | A1B1C1-tongxing |
| | One-person-one-file intention -B2 | Travel-C2 | A1B2C2-chuixing |

In an embodiment of the present application, after determining the target intention corresponding to the user identification, the electronic device queries the pre-configured intention repository, locates the level and the tree where the target intention is located, so as to obtain the level information and the tree information of where the target intention is located.

Illustratively, assuming that the target intention of the user is travel-C2, then the level of the target intention can be first located to be a third-level intention, and the corresponding second-level intention is the one-person-one-file intention-B2, and the primary intention is the person research and judgment intention-A1.

S303, obtaining the first recommendation list according to the level information and the tree information of where the target intention is located and the tree-shaped intention set corresponding to the tree information.

In an embodiment of the present application, when the electronic device determines the level information and the tree information of where the target intention is located, the tree intention set corresponding to the tree information is determined accordingly, that is, the tree intention set to which the target intention belongs. Then the first recommendation list may be generated according to the intention information of each level in the tree-shaped intention set.

Illustratively, in an embodiment of the present application, S303 may be implemented through the following steps:

A1, generating an initial recommendation list corresponding to the target intention.

Optionally, in order to recommend to a user an intention that the user desires, the electronic device may first generate an initial recommendation list based on the target intention after determining the target intention. Optionally, the target intention is located at the head of the initial recommendation list.

Illustratively, assuming that the electronic device determines that the target intention is xx-code based on the received intention query request, then an initial recommendation list including the xx-code may be generated.

A2, determining at least one associated intention of the target intention according to the level information and the tree information of where the target intention is located.

A3, obtaining the first recommendation list by adding at least one associated intention of the target intention to the initial recommendation list sequentially in an order of a same level, a superordinate level, and a tree level.

In an embodiment of the present application, the tree-shaped intent set may include a plurality of different levels, and each level has at least one intention. Therefore, in the embodiment of the present application, according to the level information of where the target intention is located, at least one associated intention of the target intention is determined at the same level, at each superordinate level, and at a tree level sequentially. Then, the first recommendation list is obtained by adding the at least one associated intention of the target intention to the initial recommendation list sequentially in an order of first the same level, then the superordinate level, and last the tree level.

Illustratively, it is assumed that the xx-code intention is a third-level intention, then third-level intention items of the same group as the xx-code intention are added to the initial recommendation list first, then all third-level intentions of a second-level intention to which the xx-code intention is subordinate are added to the initial recommendation list, and finally, all third-level intentions of a primary intention to which the xx-code intention is subordinate are added to the initial recommendation list, and the obtained final recommendation list is the first recommendation list.

Illustratively, for the tree-shaped intention set shown in Table 1, a target intention is travel-C2, there's no intention of the same group as travel-C2, and no third-level intention of the second-level intention (one-person-one-file intention-B2) to which travel-C2 is subordinate, and all of third level intentions (traveling together-C1) of the primary intention (person research and judgment intention-A1) to which travel-C2 is subordinate is added to the recommendation list, so that the obtained first recommendation list includes travel-C2 and traveling together-C1.

In this embodiment, when the first recommendation list is generated, at least one associated intention of the target intention is added to the initial recommendation list sequentially based on an order of, first the same level, then the superordinate level, and last the tree level, so that the intention that is most relevant to the target intention may be ranked first in the recommendation list, which can improve the accuracy of intention recommendation to a certain extent.

In the method for intention recommendation provided by embodiments of the present application, semantic analysis is performed on the intention keyword to determine a target intention of the user corresponding to the user identification, then the pre-configured intention repository is queried according to the target intention to determine the level information and the tree information of where the target intention is located, and finally the first recommendation list is obtained according to the level information and the tree information of where the target intention is located and the tree-shaped intention set corresponding to the tree information. This technical solution can improve the relevance order for the recommendation of newly added intentions from the intention repository, and solve the problem of low ranking of the newly added intentions due to a small number of searches and clicks for the newly added intentions.

Figure 4:
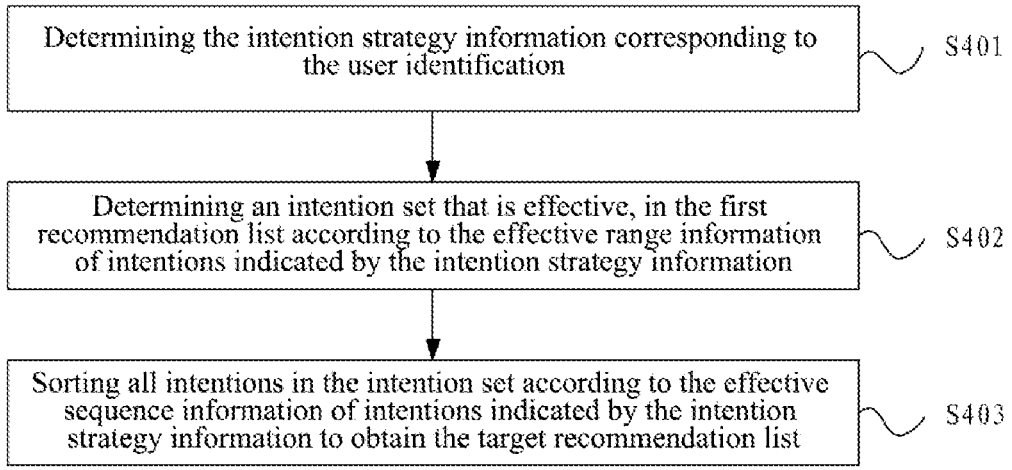
FIG. 4 is a schematic flowchart of a method for intention recommendation according to a third embodiment of the present application.

Optionally, on the basis of the foregoing embodiments, FIG. 4 is a schematic flowchart of a method for intention recommendation according to a third embodiment of the present application. As shown in FIG. 4, in this embodiment, the above S203 may be implemented through the following steps:

S401, determining the intention strategy information corresponding to the user identification, where the intention strategy information is used to indicate effective range information and effective sequence information of intentions.

In practical application, for example, in a police service scenario, in order to cope with complex and changeable tactic requirements, new intentions will continue to be added to the intention repository, and there are also outdated intentions that need to be discarded. Therefore, in an embodiment of the present application, different intention strategy information is set for different users in the electronic device, which means a personalized intervention strategy.

Illustratively, the personalized intervention strategy is set from: an intervention strategy effective globally or effective for a specific user, and an intervention strategy effective for a blacklist or a whitelist. Therefore, configuration items corresponding to the personalized intervention strategy may include: whitelist intentions effective globally, blacklist intentions effective globally, whitelist intentions effective only for a specific user, blacklist intentions effective only for a specific user, etc.

Illustratively, the representation of the configuration items is as follows:

"Whitelist" represents a whitelist intention effective globally; "blacklist" represents a blacklist intention effective globally; "personal" represents a personalized intervention configuration; "personal.userToken" represents a user id; "personal.whitelist" represents a whitelist intention effective only for a specific user, "personal.blacklist" represents a blacklist intention effective only for a specific user.

Optionally, in an embodiment of the present application, in order to determine effective range information and effective sequence information of intentions for different users, the electronic device may also be set with a priority and an execution effective order of the different configuration items. For example, the priority of intervention strategy is: blacklist>whitelist, personalized configuration>global configuration, correspondingly, the execution effective order of the intervention strategy is: global whitelist-global blacklist-personalized whitelist-personalized blacklist.

In an embodiment of the present application, the electronic device first determines the intention strategy information corresponding to the user identification according to the corresponding relationship between the user identification and the intention strategy information, and then determines the effective range information and the effective sequence information of intentions indicated by the intention strategy information.

S402, determining an intention set that is effective, in the first recommendation list according to the effective range information of intentions indicated by the intention strategy information.

In an embodiment of the present application, according to the intention strategy information corresponding to the user identification, the electronic device first determines the effective range information of intentions indicated by the intention strategy information, for example, whether the blacklist is effective, or the whitelist is effective, or the personalized whitelist corresponding to the user is effective, or the personalized blacklist corresponding to the user is effective, etc.

Correspondingly, in this embodiment, the electronic device may determine the effective intention set in the first recommendation list according to the effective range information of intentions corresponding to the user identification. For example, if the intention strategy information indicates that the whitelist is effective, then the electronic device filters the intention set corresponding to the global whitelist and the user whitelist from the first recommendation list.

S403, sorting all intentions in the intention set according to the effective sequence information of intentions indicated by the intention strategy information to obtain the target recommendation list.

Illustratively, the electronic device may also determine, according to the intention strategy information corresponding to the user identification, the effective sequence information of intentions indicated by the intention strategy information. For example, in the intervention strategy, the priority of the personalized configuration is greater than the priority of the global configuration, and the execution effective order of the intervention strategy is the global whitelist first, and then the personalized whitelist.

Therefore, in this embodiment, the electronic device may sort the intentions of the intention set, which is corresponding to the global whitelist and user whitelist filtered from the first recommendation list, according to the determined effective sequence information of intentions, thereby generating the target recommendation list.

In the method for intention recommendation provided by embodiments of the present application, intention strategy information corresponding to the user identification is determined, where the intention strategy information is used to indicate effective range information and effective sequence information of intentions, then an effective intention set is determined in the first recommendation list according to the effective range information of intention indicated by the intention strategy information, and all intentions in the above-mentioned intention set are sorted according to the effective sequence information of intentions indicated by the intention strategy information to obtain a target recommendation list. In this technical solution, according to the personalized intention intervention strategy, the personalized intention set can be obtained by filtering, and the intentions in the intention set can be sorted, thereby improving the accuracy and purposefulness of the intention recommendation.

Figure 5:
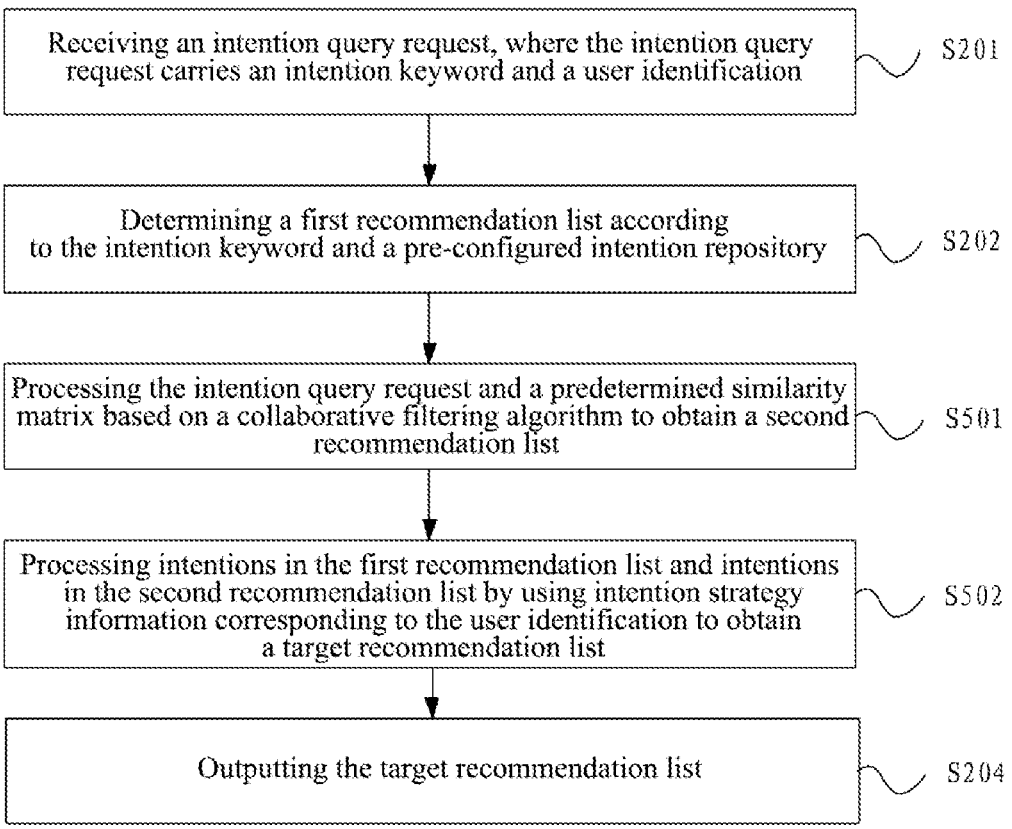
FIG. 5 is a schematic flowchart of a method for intention recommendation according to a fourth embodiment of the present application.

Furthermore, on the basis of the foregoing embodiments, FIG. 5 is a schematic flowchart of a method for intention recommendation according to a fourth embodiment of the present application. As shown in FIG. 5, in this embodiment, the method may further include the following steps:

S501, processing the intention query request and a predetermined similarity matrix based on a collaborative filtering algorithm to obtain a second recommendation list.

The second recommendation list is obtained by processing the intention query request and a predetermined user behavior similarity matrix by using a user behavior-based collaborative filtering algorithm, and/or, by processing the intention query request and a predetermined intention similarity matrix by using an intention-based collaborative filtering algorithm.

Optionally, this step can be executed before or after the above S202, and the embodiments of the present application do not limit the specific execution order of this step S501. In this embodiment, description will be made by assuming that this step is executed after S202.

In practical application, with the development of Internet technology, more and more user data can be obtained. It is possible to discovery hidden tactics and related intentions by analyzing user data on the Internet. Therefore, in the embodiments of the present application, the obtained intention query request and a similarity matrix generated based on a large amount of user data can be processed by using a collaborative filtering algorithm to determine multiple related intentions.

In a possible design of an embodiment of the present application, this step S501 may be implemented through the following steps:

processing the intention query request and a pre-generated user behavior similarity matrix by using a user behavior-based collaborative filtering algorithm to obtain the second recommendation list.

Specifically, first, a first user set is determined according to the user identification and the pre-generated user behavior similarity matrix, where the first user set includes: K users with a highest behavioral similarity to the target user (user corresponding to the user identification), where K is a positive integer. Next, a first intention set corresponding to the target user is determined according to the behavior characteristic information of the user corresponding to the user identification. Then, for any of intentions in the first intention set, a second user set corresponding to the intention is determined, and a preference score of the target user for the intention is determined according to a similarity value between the target user and each of the users in the first user set and the preference information of the each of the users for the intention. And finally, the second recommendation list is determined according to the preference score of the target user for each of the intentions in the first intention set.

Illustratively, for any intention x in the first intention set, the interest level score (preference score) of the user for intention x is expressed by the following formula:

$$\text{score}(a,x) = \Sigma_{b \in S(a,K) \cap N(x)} w_{a,b} r_{b,x}$$

where S(a, K) represents the K users with the highest behavioral similarity to user a, which is called the first user set, which is determined according to the user identification and a predetermined user behavior similarity matrix; and N(x) represents a user set which has a behavior corresponding to intention x at the same time, which is called the second user set. $w_{a,b}$ represents a similarity value between user a and user b. $r_{b,x}$ represents a preference score of user b for intention x.

Through the above method, the preference score of the user for each intention can be determined in the first intention set, and finally the scores of respective intentions in the first intention set are sorted in a descending order in the user dimension, so as to obtain the second recommendation list.

In another possible design of an embodiment of the present application, the step S501 may be implemented through the following steps:

processing the intention query request and a pre-generated intention similarity matrix by using an intention-based collaborative filtering algorithm to obtain the second recommendation list.

Specifically, first, a second intention set is determined according to the user identification and a pre-generated intention similarity matrix, where the second intention set includes: K intentions with a highest similarity to the intention corresponding to the intention query request. Next, a third intention set of the target user is determined according to behavior characteristic information of the target user (user corresponding to the user identification). Then, for any of intentions in the third intention set, a preference score of the target user is determined for the intention according to a similarity value between the intention and each of the intentions in the second intention set and the preference information of the user for the intention. And finally, the second recommendation list is determined according to the preference score of the target user for each of the intentions in the third intention set.

Illustratively, for any intention x in the third intention set, the interest level score (preference score) of the user for intention x is expressed by the following formula:

$$\text{score}(a,x) = \Sigma_{b \in S(y,K) \cap N(a)} w_{x,y} r_{a,y}$$

where S (y, K) represents the K intentions with the highest intention similarity to intention y, which is called the second intention set, where intention y is the intention determined based on the intention query request; and N(a) is a preferred intention set of user a, which is called the third intention set. $w_{x,y}$ represents a similarity value between intention x and intention y. $r_{a,y}$ represents a preference score of user a for intention y.

Through the above method, the preference score of the user for each intention in the third intention set can be determined, and finally the scores of respective intentions in the third intention set are sorted in a descending order in the user dimension, so as to obtain the second recommendation list.

In yet another possible design of an embodiment of the present application, this step S501 may be implemented through the following steps:

processing the intention query request and a pre-generated user behavior similarity matrix by using a user behavior-based collaborative filtering algorithm and processing the above-mentioned intention query request and a pre-generated intention similarity matrix by using an intention-based collaborative filtering algorithm to obtain the second recommendation list.

Specifically, in an embodiment of the present application, the user behavior recommendation list determined by the user behavior-based collaborative filtering algorithm may be integrated with the intention recommendation list determined by the user behavior-based collaborative filtering algorithm to obtain the second recommendation list. For the method for generating the user behavior recommendation list and the intention recommendation list, please refer to the record in the above possible designs, which will not be repeated here.

Correspondingly, as shown in FIG. 5, the above S203 may be replaced with the following steps:

S502, processing intentions in the first recommendation list and intentions in the second recommendation list by using intention strategy information corresponding to the user identification to obtain a target recommendation list.

In the embodiment of the present application, based on the description of S203 in the embodiment shown in FIG. 2, the electronic device may first determine the intention strategy information corresponding to the user identification, and then, intervene in the intentions in the first recommendation list and the second recommendation list determined above by using the intention strategy information corresponding the user, for example, discard some intentions, rearrange the order of the intentions, etc., so as to obtain a processed recommendation list, i.e. a target recommendation list.

Optionally, the order in which the electronic device processes the first recommendation list and the second recommendation list may be determined according to a user setting, for example, according to a certain index, such as an amount of attention, generation time and other indexes. All the intentions included in the first recommendation list and the second recommendation list are integrated, and then processed by using the intention strategy information corresponding to the user identification, thereby obtaining the target recommendation list.

In the method for intention recommendation provided by embodiments of the present application, the intention query request and a predetermined similarity matrix are processed based on a collaborative filtering algorithm to obtain a second recommendation list, and intentions in the first recommendation list and intentions in the second recommendation list are processed by using the intention strategy information corresponding to the user identification to obtain a target recommendation list. In this technical solution, hidden tactics and related intentions can be discovered by using a large amount of user behavior data and collaborative filtering recommendation, and in combination with the recommendation based on the intention content category, newly added intentions can become effective quickly, and the accuracy and purposefulness of the intention recommendation can be improved through the personalized intention strategy information.

Figure 6:
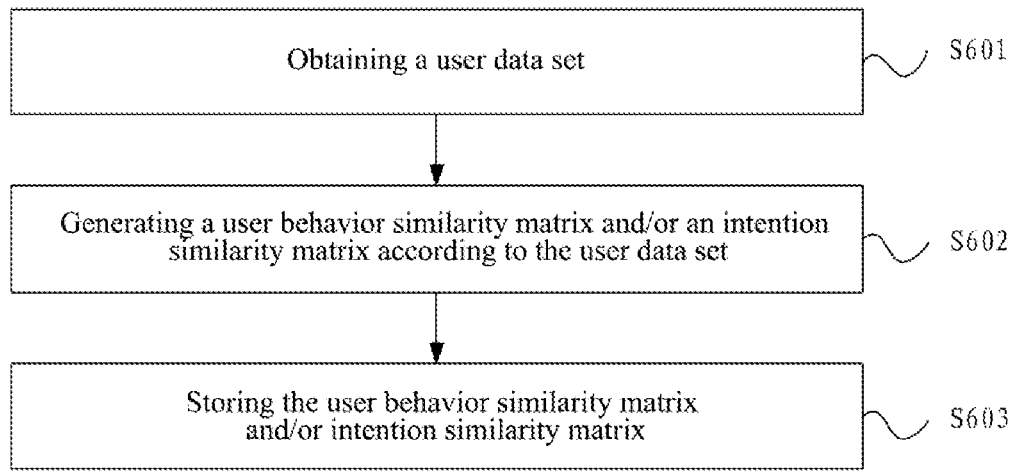
FIG. 6 is a schematic flowchart of a method for intention recommendation according to a fifth embodiment of the present application.

Optionally, on the basis of the foregoing embodiments, FIG. 6 is a schematic flowchart of a method for intention recommendation according to a fifth embodiment of the present application. As shown in FIG. 6, in this embodiment, the method may further include the following steps:

S601, obtaining a user data set.

In an embodiment of this application, in the general Internet scenario, there are a large amount of user behavior data generated in the network. Optionally, the user data set may include: a user ID, a user search content, a search interface, intention information, a search result, a time stamp and other information. Data sources include multiple logs such as an association relationship interface, a one-person-one-file interface, etc., and original user behavior data is extracted through regular matching and filtering. Illustratively, formats of various data are listed below:

User id: {"userToken": "192.0.25.64"}
Search interface: {"apiUrl": "/api/to/path"}
Search content: {"apiParmas": {"query": "blabla . . . "}}
Intention information: {"intentionCode": "A1B1C1-tongxing"}
Time stamp: {"timeStamp": 1521402351}
Search result: {"apiResponse": { . . . } }

Optionally, an original log includes structured information of the above information, the specific content of each item is obtained through regular matching for every row, and then written into a text file in csv format. The schema information is as follows: userToken \t apiUrl \t apiParams \t intentionCode \t timestamp \t apiResponse.

Optionally, the electronic device may obtain a user data set based on a preset data configuration. Illustratively, the preset configuration information may include a data source type (HDFS, HIVE, MYSQL, NoSQL . . . ), a data source path (host: port, hdfspath . . . ), an extraction manner, and an extraction period. Among them, the data source type is used to characterize a type of system that stores user identity data, the data source path is used to characterize a route taken when user identity data is extracted, the extraction manner is used to characterize what manner (incremental or full) is used for data extraction, and the extraction period is used to characterize how often data extraction is automatically performed. The extraction period can also be considered as a scheduling frequency (execution period), which is used to indicate conducting the user data extraction task at a daily level, an hour level, or a single time.

Optionally, since the log generation manner of the system is generally rolling log, a new log file is generated every day. Therefore, the data collection period is recommended to be set as being performed once every preset time (for example, one day), in an incremental manner.

Specifically, based on the content of configuration, the electronic device can read different data sources according to different data source paths. If the incremental data collection manner is used, a result of incremental matching needs to be fused with the full historical data. If the full data collection manner is used, a result of full matching needs to directly overwrite the full historical data.

Furthermore, in an embodiment of the present application, since there may be inaccurate data, delayed data, incomplete data, etc., in the original user data obtained from the network, so the quality of the collected original user data cannot be guaranteed. Optionally, for such low-quality data, the electronic device can adopt a strict filtering condition, and only retain data that fully meets a requirement, so as to minimize the impact of data noise on subsequent use. For incomplete and delayed data, a manual execution mode can be provided to periodically backtrack missing data and improve the comprehensiveness of the data.

From the above analysis, it can be seen that the embodiments of the present application provide an automated data collection solution, introduces an extraction-transform-load (etl) engineering solution for user behavior collection, and describes a process of extracting, transforming and loading data from a source end to a destination end. It realizes configurability and automation, supports incremental and full data collection, supports manual backtracking of data, and reduces a cost for data collection.

S602, generating a user behavior similarity matrix and/or an intention similarity matrix according to the user data set.

The user behavior similarity matrix is used to characterize a behavior similarity between users involved in the user data set, and the intention similarity matrix is used to characterize a similarity between intentions involved in the user data set.

In an embodiment of the present application, the purpose of collaborative filtering is to filter out intentions of no interest by analyzing search intentions of multiple users in multiple scenarios to obtain new intentions of interest. Therefore, when it is need to make personalized recommendation for a user, other users with similar behaviors need to be found first, and then preferences and search intentions of those users are added to the recommendation list.

Specifically, the electronic device first calculates a behavior eigenvector of each user based on original behavior data of the user. Optionally, the behavior eigenvector of the user may include two types of features: apiUrl (ie, query interface) and intention code. Illustratively, the behavior eigenvector of the user may be represented by histogram feature (bag of feature): [apiUrl(1), apiUrl(2), . . . , apiUrl(m), intention(1), intention(2), . . . , intention(n)], where apiUrl (m) represents the number of times the user has visited a url path of the m-th api, and intention(n) represents the number of times the user has searched for the n-th intention, and both of them represent the characteristic components of the user.

In this embodiment, the behavior similarity value between any two users in the user data set can be obtained by a cosine similarity formula as follows:

$$W_{a,b} = \frac{\sum_{i=1}^{n} x_i \times y_i}{\sqrt{\sum_{i=1}^{n} x_i^2} \times \sqrt{\sum_{i=1}^{n} y_i^2}}$$

where $W_{a,b}$ represents a behavior similarity value between user a and user b, n represents a number of dimensions of the eigenvector, $x_i$ is a characteristic component of user a, and $y_i$ is a characteristic component of user b.

For any two users in the user data set, the behavior similarity value is calculated by using the above manner. Therefore, the user behavior similarity matrix corresponding to the user data set can be obtained upon calculating.

Similarly, a user preference vector of each intention can be obtained by analyzing search and click behaviors of multiple users. Thus, a similarity matrix between intentions can be calculated based on the user preference vector of each of the intentions. Illustratively, the histogram characteristics of user preferences of each of the intentions can be represented by the following formula: [user(1), user(2), . . . , user(n)], where user(n) represents the number of searches and clicks made by the n-th user to the current intention.

In this embodiment, the intention similarity value between any two intentions in the user data set can be obtained according to a cosine similarity formula:

$$W_{p,q} = \frac{\sum_{i=1}^{n} x_i \times y_i}{\sqrt{\sum_{i=1}^{n} x_i^2} \times \sqrt{\sum_{i=1}^{n} y_i^2}}$$

where $W_{p,q}$ represents a similarity value between intention p and intention q, n represents the number of users, $x_i$ is a characteristic component of intention p, and $y_i$ is a characteristic component of intention q.

For any two intentions in the user data set, the intention similarity value is calculated by using the above manner. Therefore, the intention similarity matrix corresponding to the user data set can be obtained upon calculating.

S603, storing the user behavior similarity matrix and/or intention similarity matrix.

In an embodiment of the present application, the user behavior similarity matrix and/or the intention similarity matrix corresponding to the user data set are stored after being determined, so that they can be used directly in subsequent intention recommendation, thereby improving the efficiency of the recommendation.

Figure 7:
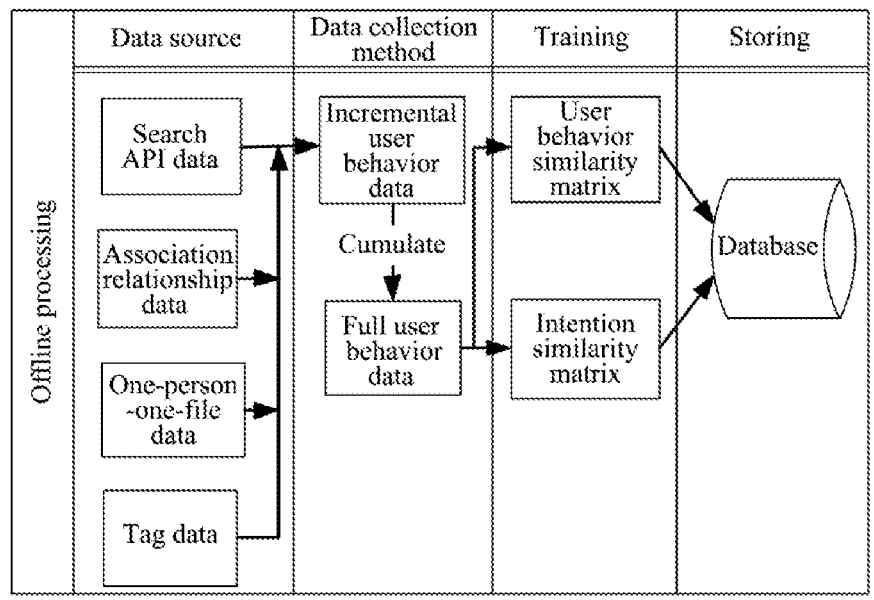
FIG. 7 is a schematic diagram of a training process of a user behavior similarity matrix and/or an intention similarity matrix according to the embodiment shown in FIG. 6.

Illustratively, FIG. 7 is a schematic diagram of a training process of a user behavior similarity matrix and/or an intention similarity matrix according to the embodiment shown in FIG. 6. As shown in FIG. 7, in an embodiment of the present application, a data source for offline training may include search API data, association relationship data, one-person-one-file data, and tag data. Accordingly, the data collection manner may be an incremental manner, that is, after incremental user behavior data is obtained, the full user behavior data is obtained in a cumulative manner, then the user behavior similarity matrix and the intention similarity matrix are respectively obtained by training, and finally the obtained user behavior similarity matrix and intention similarity matrix are stored to a database for subsequent use.

In the method for intention recommendation provided by the embodiment of the present application, a user data set is obtained, a user behavior similarity matrix and/or an intention similarity matrix is generated according to the user data set, where the user behavior similarity matrix is used to characterize the behavior similarity between users involved in the user data set, and the intention similarity matrix is used to characterize the similarity between the intentions involved in the user data set, and the user behavior similarity matrix and/or intention similarity matrix is stored. In this technical solution, the user behavior similarity matrix and the intention similarity matrix can be calculated according to the collected user data set, which facilitates subsequent use and improves the efficiency and accuracy of the intention recommendation.

In summary, in order to recommend a precise intention to a user, the embodiments of the present application adopt a grading recommendation strategy. First, a user-intention correlation result set can be obtained by using a collaborative filtering method, then related intentions can be recalled based on an intention category rule (i.e., a pre-set intention repository), and added to a recommendation list, finally a target recommendation list with a high precision can be obtained through an effective personalized intervention strategy and by taking a manner of adding and deleting a specific intention, and taking effect globally or for a specified user.

Figure 8:
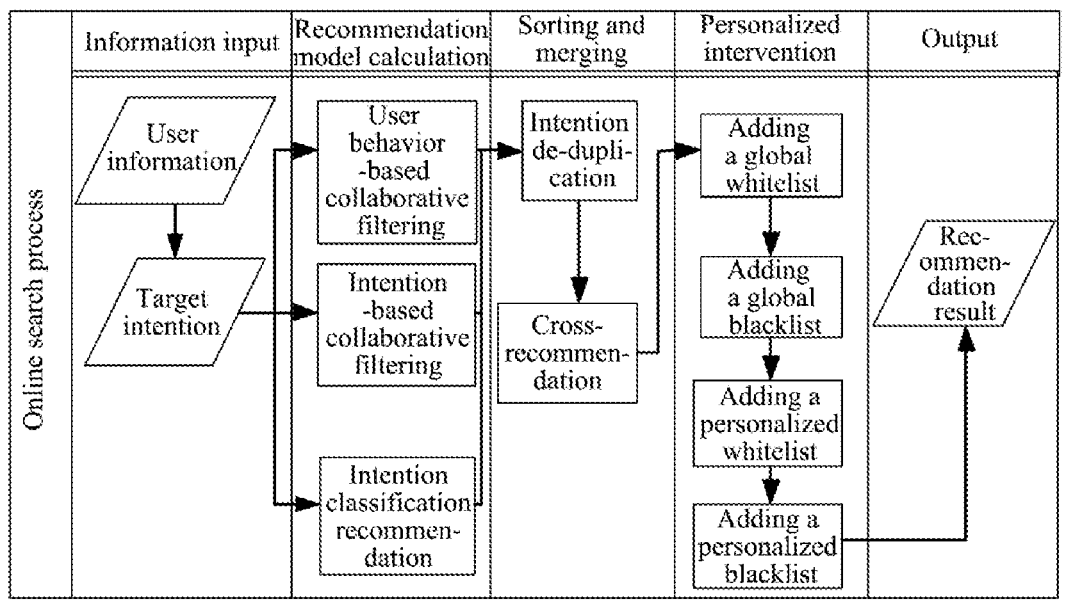
FIG. 8 is a schematic flowchart of a method for intention recommendation according to a sixth embodiment of the present application.

Illustratively, FIG. 8 is a schematic flowchart of a method for intention recommendation according to a sixth embodiment of the present application. As shown in FIG. 8, in an embodiment of the present application, an online search process can output a recommendation result after an information input stage, a recommendation model calculation stage, a sorting and merging stage, and a personalized intervention stage.

Illustratively, during the information input stage, the electronic device may obtain user information input by a user to obtain a target intention; then during the recommendation model calculation stage, perform processing such as user behavior-based collaborative filtering, intention-based collaborative filtering, and intention classification recommendation, and input an output recommendation list to the sorting and merging stage; during the sorting and merging stage, perform processing in a manner such as intention de-duplication, cross-recommendation, etc., and input a processed result to the personalized intervention stage; and finally, by performing the process such as adding a global whitelist, adding a global blacklist, adding a personalized whitelist and adding a personalized blacklist, and output a recommendation result.

It can be seen from the above analysis that the embodiments of the application propose a collaborative filtering intention recommendation scheme. By learning search-and-click intention behavior of multiple users, an intention recommendation result set can be obtained for each user, and a relatively higher accuracy and recall rate can be obtained in a scenario where a large number of users use together. A recommendation scheme based on intention content is proposed. Other intentions which are similar to the intention are directly recommended through intention classification, and when new intentions are added to the classification system, the scheme can quickly recommend the new intentions to complement a result of collaborative filtering. That is, by proposing a grading recommendation strategy, and through a collaborative filtering recommendation, an intention content recommendation, and a personalized intervention strategy, the recommendation result set still has data even when the system is cold-started, and a new intention can appear quickly after added, and as the method is used, the recommended result is richer and more accurate.

The foregoing introduces specific implementations of the method for intention recommendation mentioned in the embodiments of the present application. The following is an apparatus embodiment of the present application, which can be used to implement a method embodiment of the present application. For details not disclosed in the apparatus embodiment of the present application, please refer to the method embodiment of the present application.

Figure 9:
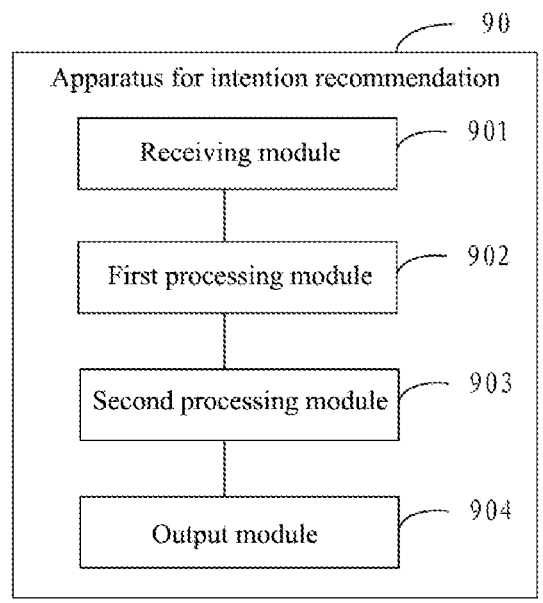
FIG. 9 is a schematic structural diagram of an apparatus for intention recommendation provided by an embodiment of the present application.

FIG. 9 is a schematic structural diagram of an apparatus for intention recommendation provided by an embodiment of the present application. The apparatus may be integrated in an electronic device or implemented by an electronic device, and the electronic device may be a terminal device or a server. As shown in FIG. 9, in this embodiment, the apparatus for intention recommendation 90 may include:

a receiving module 901, configured to receive an intention query request, where the intention query request carries an intention keyword and a user identification;

a first processing module 902, configured to determine a first recommendation list according to the intention keyword and a pre-configured intention repository, where the intention repository includes at least one tree-shaped intention set, and each of the at least one tree-shaped intention set includes at least one graded intention;

a second processing module 903, configured to process the intention in the first recommendation list by using intention strategy information corresponding to the user identification to obtain a target recommendation list; and an output module 904, configured to output the target recommendation list.

In a possible design of an embodiment of the present application, the first processing module 902 is specifically configured to:

perform semantic analysis on the intention keyword to determine a target intention of a user corresponding to the user identification;

query the pre-configured intention repository according to the target intention to determine level information and tree information of where the target intention is located; and obtain the first recommendation list according to the level information and the tree information of where the target intention is located and a tree-shaped intention set corresponding to the tree information.

The first processing module 902 is specifically configured to:

generate an initial recommendation list corresponding to the target intention;

determine at least one associated intention of the target intention according to the level information and the tree information of where the target intention is located; and obtain the first recommendation list by adding the at least one associated intention of the target intention to the initial recommendation list sequentially in an order of a same level, a superordinate level, and a tree level.

In another possible design of an embodiment of the present application, the second processing module 903 is specifically configured to:

determine intention strategy information corresponding to the user identification, where the intention strategy information is used to indicate effective range information and effective sequence information of intentions;

determine an intention set that is effective, in the first recommendation list according to the effective range information of intentions indicated by the intention strategy information; and sort all intentions in the intention set according to the effective sequence information of intentions indicated by the intention strategy information to obtain the target recommendation list.

In yet another possible design of an embodiment of the present application, the first processing module 902 is further configured to: process the intention query request and a predetermined similarity matrix based on a collaborative filtering algorithm to obtain a second recommendation list; and the second processing module 903 is specifically configured to: process the intentions in the first recommendation list and intentions in the second recommendation list by using the intention strategy information corresponding to the user identification to obtain the target recommendation list.

The second recommendation list is obtained by processing the intention query request and a predetermined user behavior similarity matrix by using a user behavior-based collaborative filtering algorithm, and/or, processing the intention query request and a predetermined intention similarity matrix by using an intention-based collaborative filtering algorithm.

In yet another possible design of an embodiment of the present application, the first processing module 902 is further configured to:

obtain a user data set;

generate a user behavior similarity matrix and/or an intention similarity matrix according to the user data set, where the user behavior similarity matrix is used to characterize a behavior similarity between users involved in the user data set, and the intention similarity matrix is used to characterize a similarity between intentions involved in the user data set; and store the user behavior similarity matrix and/or intention similarity matrix.

The apparatus provided in the embodiments of the present application can be used to execute the method in the embodiments shown in FIG. 2 to FIG. 8. The implementation principles and technical effects are similar, and will not be repeated here.

It should be noted that, it should be understood that the division of the various modules of the above apparatus is only a division of logical functions. In practical implementation, it may be fully or partially integrated into a physical entity, or physically separated. And these modules may all be implemented in a form of software called by a processing element; and may also be all implemented in a form of hardware; also, part of modules may be implemented in a form of calling software by a processing element, and part of modules may be implemented in a form of hardware. In addition, all or part of these modules may be integrated together or implemented independently. The processing element described here may be an integrated circuit with signal processing capability. In an implementation process, each step of the above method or each of the above modules can be completed by an integrated logic circuit of hardware in the processing element or instructions in a form of software.

Furthermore, according to an embodiment of the present application, the present application also provides an electronic device and a readable storage medium.

Figure 10:
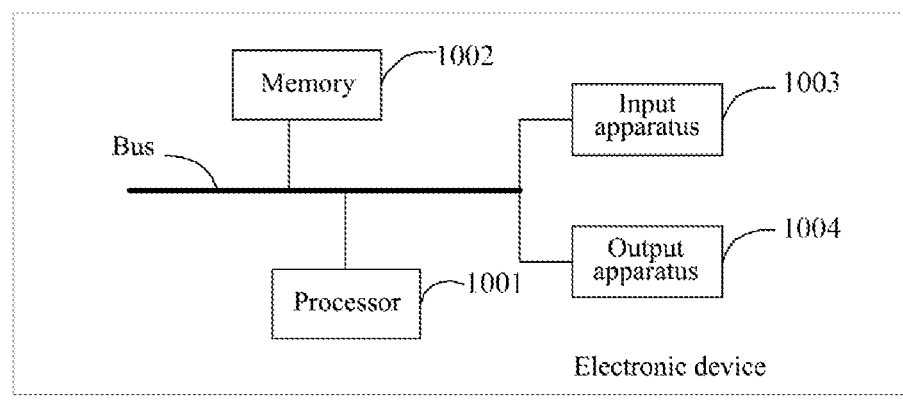
FIG. 10 is a block diagram of an electronic device used to implement a method for intention recommendation of an embodiment of the present application.

FIG. 10 is a block diagram of an electronic device used to implement a method for intention recommendation of an embodiment of the present application. The electronic device is intended to represent various forms of digital computers, such as a laptop computer, a desktop computer, a workbench, a personal digital assistant, a server, a blade server, a mainframe computer, and other suitable computers. The electronic device can also represent various forms of mobile apparatus, such as a personal digital assistant, a cellular phone, a smart phone, a wearable device, and other similar computing apparatus. The components, their connections and relationships, and their functions herein are merely examples, and are not intended to limit an implementation of the application described and/or claimed herein.

As shown in FIG. 10, the electronic device includes: one or more processors 1001, a memory 1002, and interfaces for connecting various components, including a high-speed interface and a low-speed interface. The components are connected to each other with different buses and can be installed on a common main board or in other ways as needed. The processor may process instructions executed within the electronic device, including instructions stored in or on the memory to display graphical information of graphical user interface (GUI) on an external input/output apparatus (such as a display device coupled to the interface). In other embodiments, if required, multiple processors and/or buses can be used with multiple memories. Similarly, multiple electronic devices can be connected, and each device provides some necessary operations (for example, as a server array, a group of blade servers, or a multi-processor system). In FIG. 10, one processor 1001 is taken as an example.

The memory 1002 is a non-transitory computer readable storage medium according to the present application. The memory is stored with instructions executable by at least one processor, to cause the at least one processor to execute the method for intention recommendation according to the present application. The non-transitory computer readable storage medium of the present application is stored with computer instructions, and the computer instructions are configured to enable a computer to execute the method for intention recommendation according to the present application.

The memory 1002 acting as a non-transitory computer-readable storage medium can be used to store a non-transitory software program, a non-transitory computer executable program and a module, such as program instructions/modules corresponding to the method for intention recommendation in the embodiments of the present application. The processor 1001 executes various functional applications and data processing of the server by running the non-transitory software program, the instructions, and the module stored in the memory 1002, that is, implementing the method for intention recommendation in the foregoing method embodiments.

The memory 1002 may include a program storage area and a data storage area, where the program storage area may be stored with an application program required by an operating system and at least one function; the data storage area may be stored with data created according to the use of the electronic device for intention recommendation, and so on. In addition, the memory 1002 may include a high-speed random access memory or a non-transitory memory, such as at least one magnetic disk storage device, a flash memory device, or other non-transitory solid-state storage devices. In some embodiments, the memory 1002 optionally includes memories remotely provided with respect to the processor 1001, and these remote memories may be connected to the electronic device for intention recommendation through a network. Examples of the above network include, but are not limited to, Internet, an intranet, a local area network, a mobile communication network, and a combination of them.

The electronic device for implementing the method for intention recommendation may further include: an input apparatus 1003 and an output apparatus 1004. The processor 1001, the memory 1002, the input apparatus 1003 and the output apparatus 1004 may be connected through a bus or in other ways. In FIG. 10, connection through a bus is used as an example.

The input apparatus 1003 can receive input digital or character information, and generate a key signal input related to user settings and function control of the electronic device for intention recommendation, such as a touch screen, a keypad, a mouse, a track pad, a touch panel, an indicator stick, one or more mouse buttons, a trackball, a joystick and other input apparatus. The output apparatus 1004 may include a display device, an auxiliary lighting apparatus (such as an LED), a tactile feedback apparatus (such as a vibration motor), and so on. The display device may include, but is not limited to, a liquid crystal display (LCD), a light emitting diode (LED) display, and a plasma display. In some embodiments, the display device may be a touch screen.

Various embodiments of the systems and techniques described herein may be implemented in a digital electronic circuitry, an integrated circuit system, a special-purpose ASIC (application-specific integrated circuit), computer hardware, firmware, software, and/or a combination of them. These various embodiments may include: implementations in one or more computer programs which may be executed and/or interpreted on a programmable system including at least one programmable processor. The programmable processor may be a special-purpose or general programmable processor, and may receive data and instructions from a storage system, at least one input apparatus, and at least one output apparatus, and transmit the data and instructions to the storage system, the at least one input apparatus, and the at least one output apparatus.

These computer programs (also known as programs, software, software applications, or codes) include machine instructions of the programmable processor, moreover, these computer programs may be implemented with a high-level process and/or an object-oriented programming language, and/or an assembly/machine language. As used herein, the terms "machine-readable medium" and "computer-readable medium" refer to any computer program product, device, and/or apparatus (for example, a magnetic disk, an optical disk, a memory, a programmable logic device (PLD)) used to provide machine instructions and/or data to the programmable processor, including the machine-readable medium that receives machine instructions as a machine-readable signal. The term "machine-readable signal" refers to any signal used to provide the machine instructions and/or data to the programmable processor.

In order to provide interaction with users, the systems and techniques described herein may be implemented on a computer, where the computer has: a display apparatus (for example, a CRT (cathode ray tube) or an LCD (liquid crystal display) monitor) for displaying information to users; and a keyboard and a pointing apparatus (for example, a mouse or a trackball) though which users may provide input to the computer. Other types of apparatus may also be used to: provide interaction with users; for example, the feedback provided to users may be any form of sensing feedback (for example, visual feedback, audible feedback, or tactile feedback); and the input from users may be received in any form (including sound input, voice input, or tactile input).

The systems and techniques described herein may be implemented in a computing system that includes a back end component (for example, a data server), or a computing system that includes a middleware component (for example, an application server), or a computing system that includes a front end component (for example, a user computer with a graphical user interface or a web browser, through which the user can interact with the implementations of the systems and techniques described herein), or a computing system that includes any combination of such back end component, middleware component, or front end component. System components may be connected to each other by any form or medium of digital data communication (for example, a communication network). Examples of the communication network include: a local area network (LAN), a wide area network (WAN), and Internet.

A computing system may include a client and a server. The client and the server are generally far from each other and usually perform interactions through a communication network. A relationship between the client and the server is generated by a computer program running on a corresponding computer and having a client-server relationship.

Embodiments of the application also provide a method for intention recommendation, including:

determining a first recommendation list according to a received intention query request and an intention category rule; and processing intentions in the first recommendation list by using a preset intention intervention strategy to obtain a target recommendation list.

According to the technical solution of the embodiment of the present application, a first recommendation list is determined according to an received intention query request and an intention category rule; and intentions in the first recommendation list are processed by using a preset intention intervention strategy to obtain a target recommendation list, intentions having relatively high relevance to the intention query request can be determined, and a personalized recommendation result can be improved based on the intention strategy information of the user identification, thereby improving the accuracy and personalization precision of the intention recommendation.

It should be understood that various forms of processes shown above can be used, and steps may be reordered, added, or deleted. For example, the steps described in the present application may be performed in parallel or sequentially or in different orders. As long as desired results of the technical solutions disclosed in the present application can be achieved, no limitation is made herein.

The above specific embodiments do not constitute a limitation to the protection scope of the present application. Persons skilled in the art should know that various modifications, combinations, sub-combinations and substitutions can be made according to design requirements and other factors. Any modification, equivalent replacement and improvement made within the spirit and principle of the present application shall be included in the protection scope of the present application.

What is claimed is:

1. A method for intention recommendation, comprising:
   receiving an intention query request, wherein the intention query request carries an intention keyword and a user identification;
   determining a first recommendation list according to the intention keyword and a pre-configured intention repository, wherein the intention repository comprises at least one tree-shaped intention set, and each of the at least one tree-shaped intention set comprises at least one graded intention;
   processing intentions in the first recommendation list by using intention strategy information corresponding to the user identification to obtain a target recommendation list; and
   outputting the target recommendation list;
   wherein the processing intentions in the first recommendation list by using intention strategy information corresponding to the user identification to obtain a target recommendation list comprises:
   determining the intention strategy information corresponding to the user identification, wherein the intention strategy information is used to indicate effective range information and effective sequence information of intentions;
   determining an intention set that is effective, in the first recommendation list according to the effective range information of intentions indicated by the intention strategy information; and
   sorting all intentions in the intention set according to the effective sequence information of intentions indicated by the intention strategy information to obtain the target recommendation list.

2. The method according to claim 1, wherein the determining a first recommendation list according to the intention keyword and a pre-configured intention repository comprises:
   performing semantic analysis on the intention keyword to determine a target intention of a user corresponding to the user identification
   querying the pre-configured intention repository according to the target intention to determine level information and tree information of where the target intention is located; and
   obtaining the first recommendation list according to the level information and the tree information of where the target intention is located and a tree-shaped intention set corresponding to the tree information.

3. The method according to claim 2, wherein the obtaining the first recommendation list according to the level information and the tree information of where the target intention is located and a tree-shaped intention set corresponding to the tree information comprises:
   generating an initial recommendation list corresponding to the target intention;
   determining at least one associated intention of the target intention according to the level information and the tree information of where the target intention is located; and
   obtaining the first recommendation list by adding the at least one associated intention of the target intention to the initial recommendation list sequentially in an order of a same level, a superordinate level, and a tree level.

4. The method according to claim 1, wherein the method further comprising:
   processing the intention query request and a predetermined similarity matrix based on a collaborative filtering algorithm to obtain a second recommendation list; and
   the processing intentions in the first recommendation list by using intention strategy information corresponding to the user identification to obtain a target recommendation list comprises:
   processing the intentions in the first recommendation list and intentions in the second recommendation list by using the intention strategy information corresponding to the user identification to obtain the target recommendation list.

5. The method according to claim 4, wherein the second recommendation list is obtained by processing the intention query request and a predetermined user behavior similarity matrix by using a user behavior-based collaborative filtering algorithm, and/or, processing the intention query request and a predetermined intention similarity matrix by using an intention-based collaborative filtering algorithm.

6. The method according to claim 4, wherein the method further comprising:
   obtaining a user data set;
   generating a user behavior similarity matrix and/or an intention similarity matrix according to the user data set, wherein the user behavior similarity matrix is used to characterize a behavior similarity between users involved in the user data set, and the intention similarity matrix is used to characterize a similarity between intentions involved in the user data set; and
   storing the user behavior similarity matrix and/or intention similarity matrix.

7. An electronic device, comprising:
   at least one processor; and
   a memory communicatively connected to the at least one processor;
   wherein the memory stores instructions thereon, and the instructions, when executed by the at least one processor, cause the at least one processor to:
   receive an intention query request, wherein the intention query request carries an intention keyword and a user identification;
   determine a first recommendation list according to the intention keyword and a pre-configured intention repository, wherein the intention repository comprises at least one tree-shaped intention set, and each of the at least one tree-shaped intention set comprises at least one graded intention;

process intentions in the first recommendation list by using intention strategy information corresponding to the user identification to obtain a target recommendation list; and output the target recommendation list;

wherein the at least one processor is configured to:

determine the intention strategy information corresponding to the user identification, wherein the intention strategy information is used to indicate effective range information and effective sequence information of intentions;

determine an intention set that is effective, in the first recommendation list according to the effective range information of intentions indicated by the intention strategy information; and sort all intentions in the intention set according to the effective sequence information of intentions indicated by the intention strategy information to obtain the target recommendation list.

8. The electronic device according to claim 7, wherein the at least one processor is configured to:

perform semantic analysis on the intention keyword to determine a target intention of the user corresponding to the user identification;

query the pre-configured intention repository according to the target intention to determine level information and tree information of where the target intention is located; and obtain the first recommendation list according to the level information and the tree information of where the target intention is located and a tree-shaped intention set corresponding to the tree information.

9. The electronic device according to claim 8, wherein the at least one processor is configured to:

generate an initial recommendation list corresponding to the target intention;

determine at least one associated intention of the target intention according to the level information and the tree information of where the target intention is located; and obtain the first recommendation list by adding at least one associated intention of the target intention to the initial recommendation list sequentially in an order of a same level, a superordinate level, and a tree level.

10. The electronic device according to claim 7, wherein the at least one processor is further configured to:

process the intention query request and a predetermined similarity matrix based on a collaborative filtering algorithm to obtain a second recommendation list; and process the intentions in the first recommendation list and intentions in the second recommendation list by using the intention strategy information corresponding to the user identification to obtain the target recommendation list.

11. The electronic device according to claim 10, wherein the second recommendation list is obtained by processing the intention query request and a predetermined user behavior similarity matrix by using a user behavior-based collaborative filtering algorithm, and/or, processing the intention query request and a predetermined intention similarity matrix by using an intention-based collaborative filtering algorithm.

12. The electronic device according to claim 10, wherein the at least one processor is further configured to:

obtain a user data set;

generate a user behavior similarity matrix and/or an intention similarity matrix according to the user data set, wherein the user behavior similarity matrix is used to characterize a behavior similarity between users involved in the user data set, and the intention similarity matrix is used to characterize a similarity between intentions involved in the user data set; and store the user behavior similarity matrix and/or intention similarity matrix.

13. A non-transitory computer readable storage medium stored with computer instructions, wherein the computer instructions are configured to enable a computer to execute the method according to claim 1.

* * * * *